United States Patent
Akagi et al.

(10) Patent No.: US 6,816,219 B2
(45) Date of Patent: Nov. 9, 2004

(54) LIQUID CRYSTAL PANEL AND METHOD FOR MANUFACTURING SAME

(75) Inventors: Makoto Akagi, Kanagawa (JP); Tomoki Kurata, Kanagawa (JP); Hisashi Kadota, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 10/616,435

(22) Filed: Jul. 9, 2003

(65) Prior Publication Data

US 2004/0095537 A1 May 20, 2004

(30) Foreign Application Priority Data

Jul. 12, 2002 (JP) ........................................ 2002-203439

(51) Int. Cl.[7] ............................................ G02F 1/1337
(52) U.S. Cl. ........................ 349/125; 349/129; 349/136; 349/187
(58) Field of Search ................................ 349/125, 129, 349/130, 132, 136, 187; 428/1.21

(56) References Cited

U.S. PATENT DOCUMENTS

| | | | | |
|---|---|---|---|---|
| 4,139,273 A | * | 2/1979 | Crossland et al. | 349/35 |
| 4,291,948 A | * | 9/1981 | Crossland et al. | 349/125 |
| 5,268,781 A | * | 12/1993 | Shigeta et al. | 349/125 |
| 6,297,865 B1 | * | 10/2001 | Matsui et al. | 349/123 |

\* cited by examiner

*Primary Examiner*—Toan Ton
*Assistant Examiner*—Tai Duong
(74) *Attorney, Agent, or Firm*—Robert J. Depke; Holland & Knight LLP (57) ABSTRACT

A liquid crystal panel has a liquid crystal layer of liquid crystal molecules sealed between a pair of substrates having alignment films thereon. Each of the films includes first and second deposited layers, each of the layers being formed of an inorganic material by oblique deposition. The second layer is stacked on top of the first layer such that the deposited molecules of the first layer are aligned substantially perpendicular to the orientation of the deposited molecules of the second layer. The first layer is formed by oblique deposition at an oblique angle of about 60° relative to the normal of the substrate surface to align the liquid crystal molecules perpendicular to the deposited molecules. The second layer is formed by oblique deposition at an oblique angle of about 85° relative to the normal of the substrate surface to align the liquid crystal molecules parallel to the deposited molecules.

6 Claims, 7 Drawing Sheets

LIQUID CRYSTAL PANEL AND METHOD FOR MANUFACTURING SAME

BACKGROUND OF THE INVENTION

1. Field of the Invention

The present invention relates to a liquid crystal panel and a method for manufacturing the same. In particular, the present invention relates to a liquid crystal panel which is suitable for use as a liquid crystal light valve for a projection display (liquid crystal projector) and a method for manufacturing the same.

2. Description of the Related Art

A liquid crystal panel used as a liquid crystal light valve for a liquid crystal display device and even for a liquid crystal projector has a liquid crystal layer sealed between a pair of substrates provided with alignment films thereon. In manufacturing such a liquid crystal panel, an alignment film is formed by rubbing a polyimide or polyamide resin film.

Rubbing, however, causes problems such as formation of scratches and foreign substances on a surface of the resin film (alignment film). In addition, the resin film may not be rubbed uniformly over the entire surface. Furthermore, the resin alignment film easily deteriorates with light. For a liquid crystal projector, its liquid crystal light valve (liquid crystal panel) is irradiated with intense light (incident light) from a light source. Since the intensity of the incident light is increasing nowadays, a resin alignment film is more likely to deteriorate to such a degree as to cause bubbles.

In viewing this, a method for forming an alignment film of an inorganic material such as silicon oxide was proposed and is now used in practice. This method is referred to as oblique deposition in which vapor of an inorganic material such as silicon oxide is supplied at a predetermined oblique angle relative to the normal of a substrate to form an alignment film composed of deposited molecules (molecules of the inorganic material) oriented in the same direction on a surface of the substrate. An alignment film formed by this non-rubbing oblique deposition is free of foreign substances, scratches, or poor alignment. Another advantage of oblique deposition is that the inorganic material used is light resistant to such a level that deterioration of the film is negligible.

Oblique deposition, however, exhibits the following disadvantage when the alignment film formed is used in a liquid crystal panel in TN mode.

When a voltage is applied to drive a liquid crystal panel, the liquid crystal molecules must be preliminary tilted at a predetermined angle (pre-tilt angle) relative to the substrate, in order to align the rising direction of the liquid crystal molecules.

Taking into consideration the fact that a pre-tilt angle from about 5° to 12° is ideal for a TN-mode liquid crystal panel, an alignment film formed by rubbing is more advantageous because it provides a pre-tilt angle from about 2° to 7°. On the other hand, an alignment film formed by oblique deposition of silicon oxide may provide a pre-tilt angle as high as 20° to 30° or 0° (no tilting) depending on the deposition angle. Thus, a TN-mode liquid crystal panel including alignment films formed by oblique deposition of an inorganic material cannot satisfactorily align the rising directions of liquid crystal molecules at a time of voltage application, leading to display defects accordingly.

SUMMARY OF THE INVENTION

In order to solve the foregoing problems, a liquid crystal panel according to the present invention has a liquid crystal layer sealed between a pair of substrates having alignment films thereon. Each of the alignment films is composed of a first deposited layer and a second deposited layer on top of the first deposited layer by oblique deposition of an inorganic material, the deposited molecules of the first deposited layer being aligned substantially perpendicular to the orientation of the deposited molecules of the second deposited layer. In this liquid crystal panel, the first deposited layer has the deposited molecules aligned perpendicular to the orientation of the liquid crystal molecules, and may be formed by oblique deposition that supplies the deposited molecules at a predetermined angle (deposition angle) of, for example, about 60° relative to the normal of the substrate surface. The second deposited layer has the deposited molecules aligned parallel to the orientation of the liquid crystal molecules, and may be formed by oblique deposition that supplies the deposited molecules at a predetermined angle (deposition angle) of about 85° relative to the normal of the substrate surface.

According to the present invention, a method for manufacturing such a liquid crystal panel includes the steps of forming a first deposited layer on the substrates by oblique deposition and forming a second layer on top of the first layer also by oblique deposition. In the second step above, the deposition molecules are supplied onto the surfaces of the substrates from a direction shifted by about 90° from the oblique deposition direction in the first step.

Figure 1:
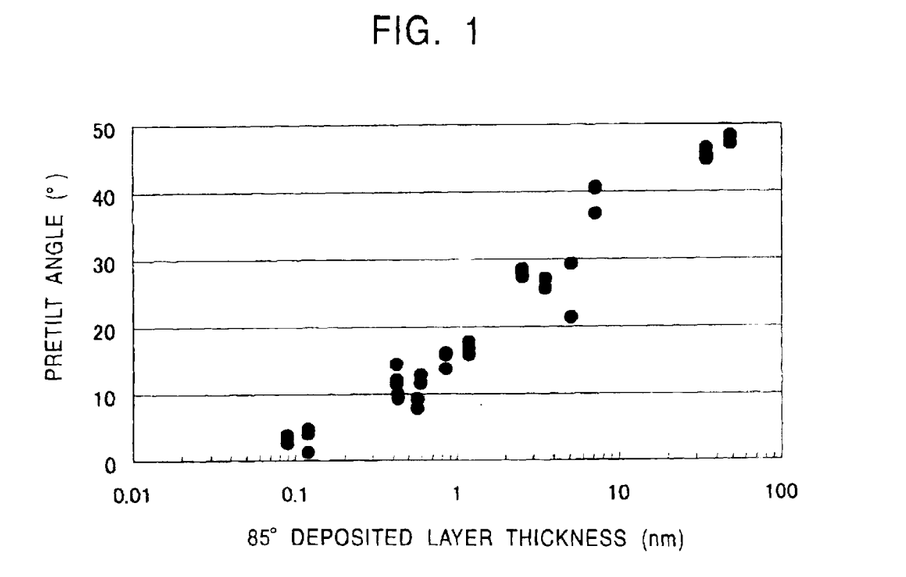
FIG. 1 shows a correlation between the thickness of a second deposited layer (deposition angle of 85°) and the pre-tilt-angles of liquid crystal molecules.

In the liquid crystal panel and the method for manufacturing the liquid crystal panel according to the present invention, each of the alignment films is formed of a first deposited layer, whose deposited molecules are aligned at an angle of 90° to the orientation of the liquid crystal molecules, and a second deposited layer stacked on top of the first deposited layer such that the deposited molecules of the first deposited layer are aligned substantially perpendicular to the orientation of the deposited molecules of the second deposited layer. In such an alignment film, a desirable pre-tilt angle of liquid crystal molecules is achieved by adjusting the thickness of the second deposited layer relative to the thickness of the first deposited layer. FIG. 1 shows how pre-tilt angles of liquid crystal molecules change depending on the thickness of the second deposited layer (deposition angle of 85°) with respect to the first deposited layer with a thickness of about 40 nm (deposition angle of 60°). As shown in FIG. 1, the pre-tilt angles of liquid crystal molecules are substantially proportional to the thickness of the second deposited layer. Based on the graphs shown in FIG. 1, the second deposited layer preferably has a thickness of about 0.1 nm to 0.5 nm to achieve a pre-tilt angle of about 5° to 12°, which is ideal for a TN-mode liquid crystal panel.

Thus, the liquid crystal panel and the method for manufacturing the liquid crystal panel according to the present invention are advantageous in that the liquid crystal panel has alignment films of inorganic material resistant to light and provides a pre-tilt angle suitable for a TN-mode liquid crystal panel, for example, by properly controlling the thickness of the two deposited layers constituting each of the alignment films.

As a result, the liquid crystal panel according to the present invention is superior in long-term reliability, prevents display defects at the time of voltage application, and provides a quick response.

DESCRIPTION OF THE PREFERRED EMBODIMENTS

A liquid crystal panel and a method for manufacturing the liquid crystal panel according to embodiments of the present invention will now be described with reference to the attached drawings. For this purpose, a method for manufacturing a TN-mode liquid crystal panel will be described.

A pair of glass substrates is prepared. Then, thin film transistors are formed on a first main surface of one of the substrates. Signal lines, scanning lines, and pixel electrodes connected to the thin film transistors are also formed on the same surface of the same substrate (referred to as the TFT substrate). A common electrode is formed on a first main surface of the other substrate (referred to as the opposite substrate). The pixel electrodes and the common electrode must be transparent.

Figure 2:
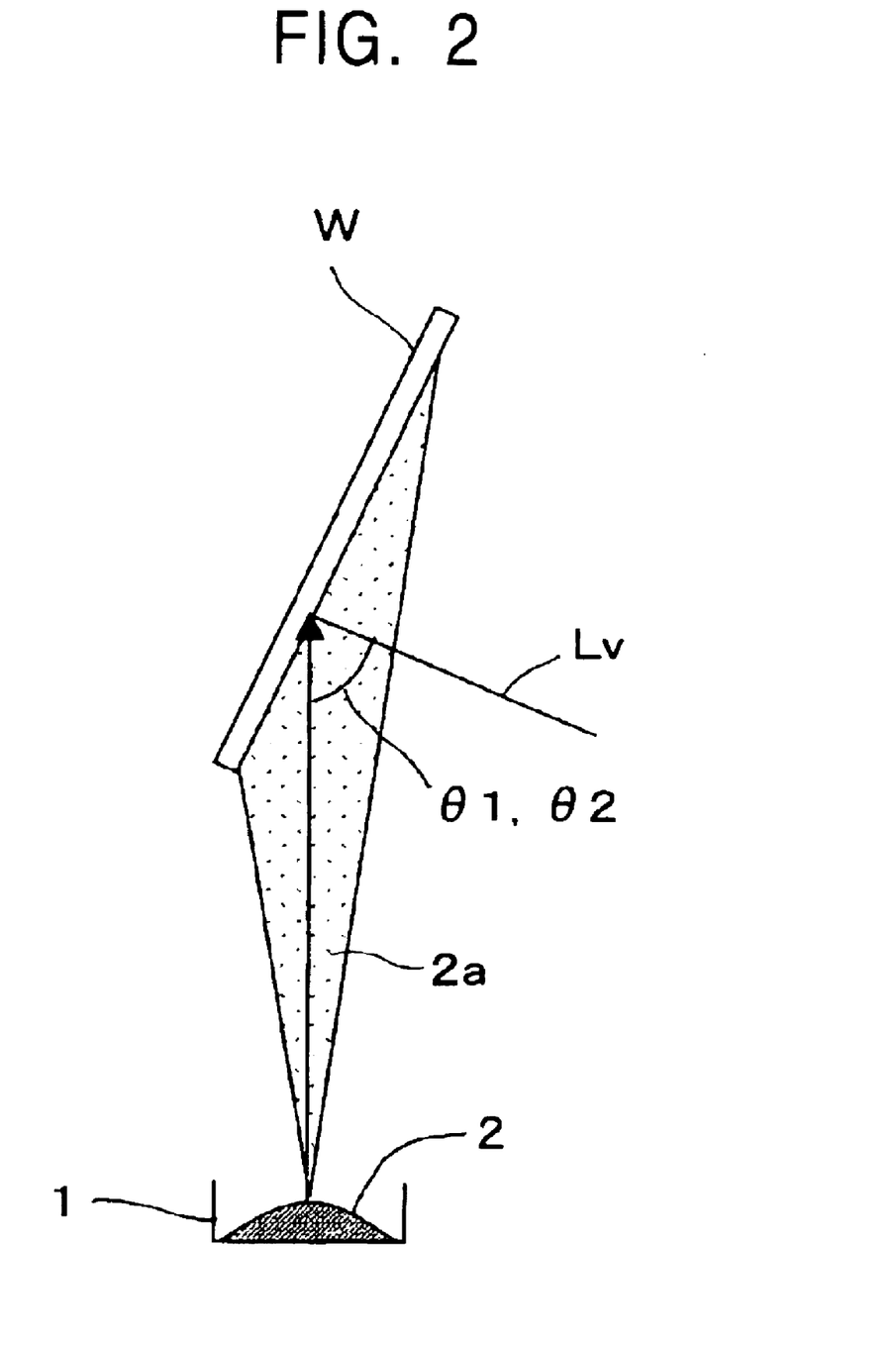
FIG. 2 is a diagram illustrating oblique deposition onto a substrate W.

Then, alignment films are formed on the first main surfaces (surfaces having electrodes thereon) of the TFT substrate and opposite substrate by oblique deposition of an inorganic material such as silicon oxide ($SiO_2$ or $SiO_x$). This oblique deposition must include two steps as shown in FIG. 2, where vapor of an inorganic material 2 from a deposition source 1 is applied to one main surface of a substrate W at predetermined deposition angles (incident angles of vapor of the inorganic material) $\theta 1$ (first step) and $\theta 2$ (second step) relative to the normal Lv on the main surface of the substrate W.

In more detail, referring to FIG. 3A, the first step includes oblique deposition at a first deposition angle of $\theta 1$ to form a first deposited layer 4a on the substrate W, so that liquid crystal molecules 6, as described below, are aligned perpendicular to the orientation of deposited molecules 4 (obliquely deposited columns) of the first deposited layer 4a, i.e., the major axes of the liquid crystal molecules 6 are aligned perpendicular to the major axes of the deposited molecules 4. This first deposition angle $\theta 1$ may be of any value and is preferably about 60° in this embodiment. The first deposition angle $\theta 1$ of about 60° provides a deposited layer having the characteristics described above, regardless of the thickness of the deposited layer. The first deposited layer 4a with a thickness of 10 nm to 320 nm, specifically 40 nm, for example, is formed by the oblique deposition described above.

Figure 3A:
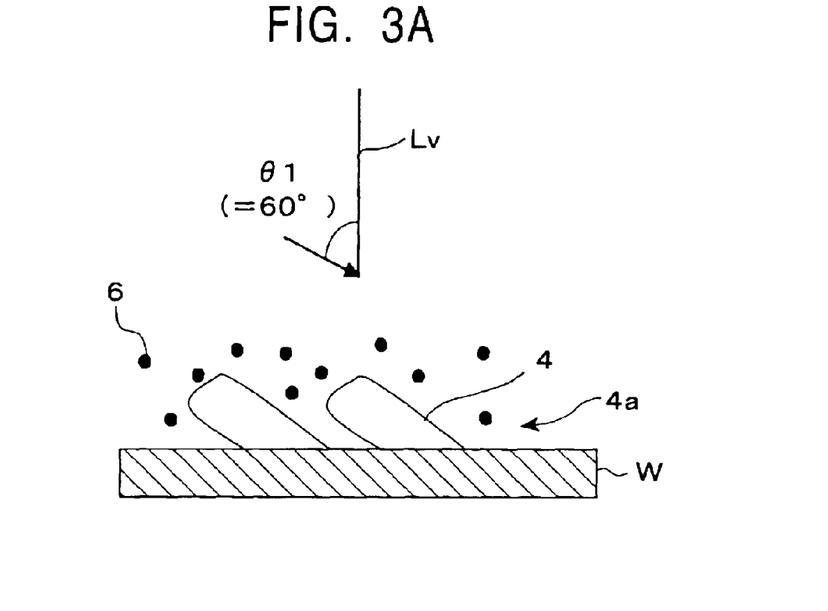
FIGS. 3A and 3B are diagrams illustrating how the liquid crystal molecules are aligned relative to the molecules of first and second layers formed by respective oblique deposition.
Figure 3B:
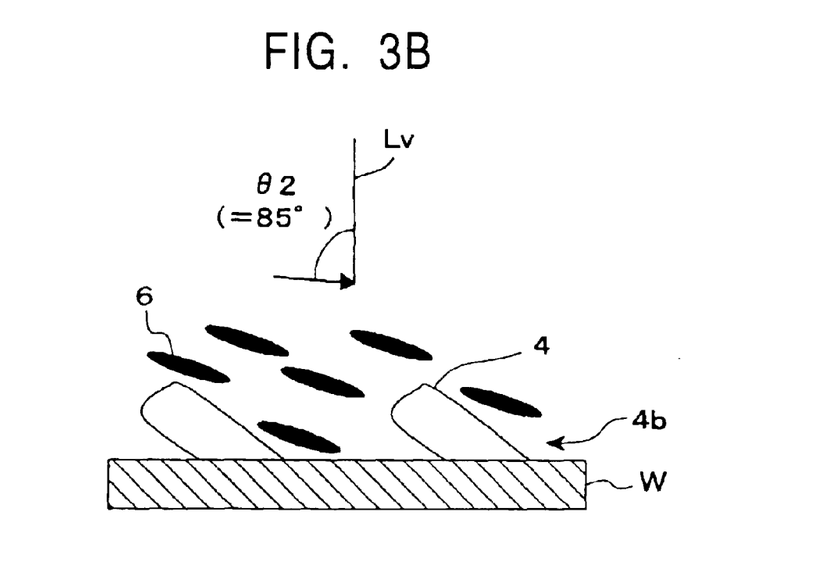

Referring now to FIG. 3B, the second step includes oblique deposition at a second deposition angle $\theta 2$ to form a second deposited layer 4b on the substrate W, so that the liquid crystal molecules 6 are aligned parallel to the orientation of deposited molecules 4, i.e., the major axes of the liquid crystal molecules 6 are aligned along the major axes of the deposited molecules 4. This second deposition angle $\theta 2$ may be of any value and is preferably about 85° in this embodiment. In the case of the second deposition angle $\theta 2$ of about 85°, a wide range of pre-tilt angles can be achieved, as will be described below, by adjusting the thickness of the second deposited layer 4b stacked on top of the first deposited layer 4a that has been formed at the first deposition angle $\theta 1$ of 60°. Thus, the second deposited layer 4b must be formed by the oblique deposition described above. The thickness of the second deposited layer 4b must be controlled within an appropriate range according to the thickness of the first deposited layer 4a. In this embodiment that is intended for manufacturing a TN-mode liquid crystal panel, the thickness of the second deposited layer 4b preferably ranges from about 0.1 nm to 0.5 nm if the first deposited layer 4a has a thickness of 40 nm. In FIGS. 3A and 3B, each of the first deposited layer 4a and the second deposited layer 4b is illustrated as if composed of a single layer of deposited molecules 4; in fact, each of the layers 4a and 4b is composed of multiple layers of deposited molecules 4.

Figure 4:
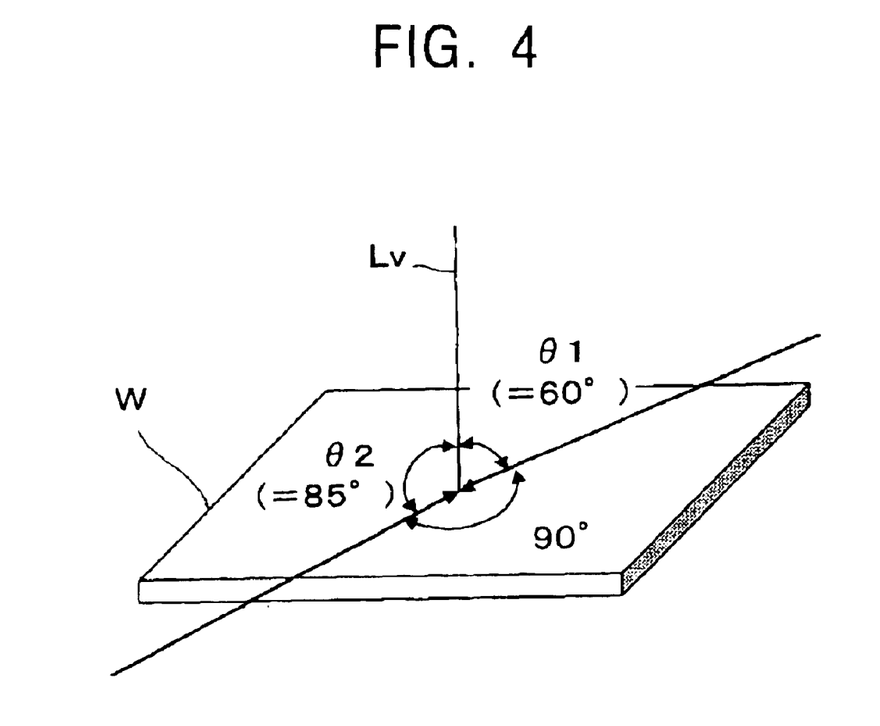
FIG. 4 is a diagram illustrating the directional relationship between the oblique deposition in the first step and the oblique deposition in the second step.

Referring now to FIG. 4, oblique deposition with a deposition angle $\theta 2$ in the second step must be carried out in a direction shifted by about 90° from the direction in which the first step has supplied deposition molecules onto the surface of the substrate W at the deposition angle $\theta 1$. In other words, referring back to FIG. 2, oblique deposition in the first step is carried out at the deposition angle $\theta 1$, then the substrate W is turned by 90° within its plane, and final oblique deposition in the second step is carried out at the deposition angle $\theta 2$.

The two steps of oblique deposition described above will be detailed in the following example. A pair of substrates W with a diagonal length of 90 inches is prepared. Powdered $SiO_2$ (purity of 99.9%) as an inorganic material 2 (stock material for deposition) is put into a crucible as a deposition source 1. The distance from the center of each substrate W to the deposition source 1 is set to about 600 nm. In this state, the substrates W are each positioned at the angle and in the direction required for the above first step. The internal pressure of the deposition chamber is maintained below $8.5 \times 10$ Pa. The inorganic material 2 is heated by electron beam irradiation, so that vapored molecules spread over the substrates W disposed above the deposition source 1 to form a first deposited layer. Then, the substrates W are each positioned at the angle and in the direction required for the second step and the steps described above are repeated to form a second deposited layer. A sealant described below will be applied over some areas on the surfaces of the substrates W. During oblique deposition described above, therefore, these areas used for sealing must be covered with a mask to inhibit deposition of vapored molecules thereon. After this two-step oblique deposition, the substrates W are degassed and then annealed for one hour at 200° C. to stabilize the quality of the layers.

After the two layers of each alignment film are deposited on the substrates W, a liquid crystal panel is assembled using these substrates.

Figure 5:
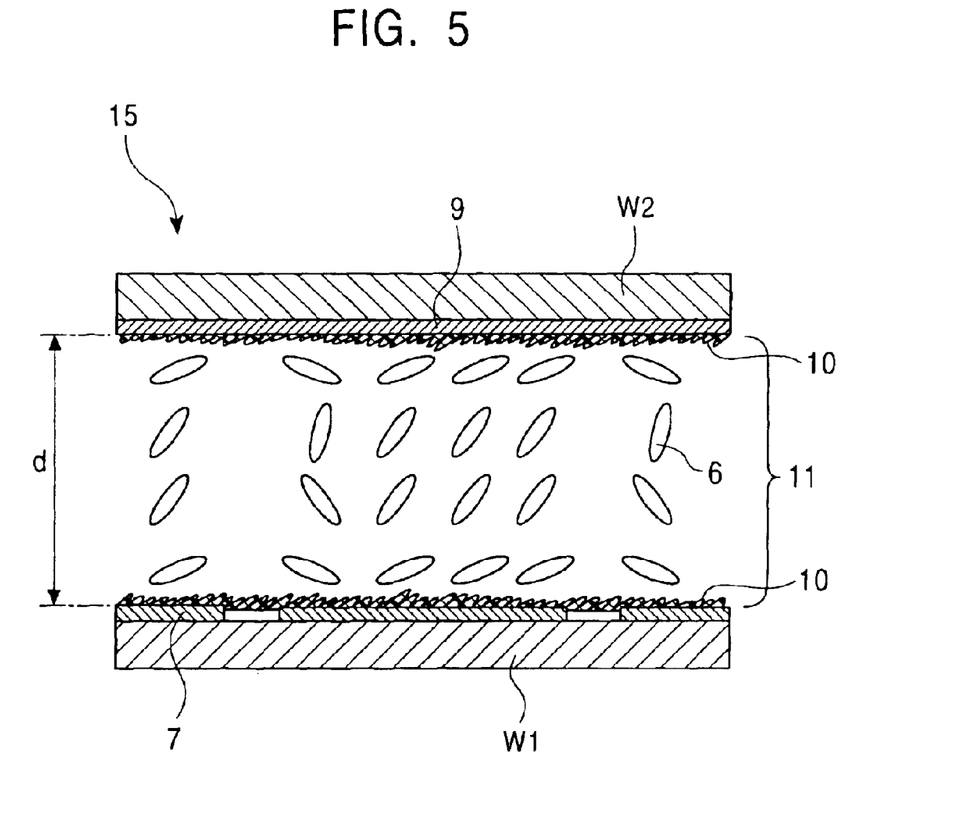
FIG. 5 is a sectional view of a liquid crystal panel according to an embodiment.

Referring now to FIG. 5, one of the substrates described above is the TFT substrate W1 and the other substrate is the opposite substrate W2. In order to assemble a liquid crystal panel 15 according to this embodiment, spacers are distributed over the surface of the TFT substrate W1 having the pixel electrodes 7 and the foregoing alignment film 10 thereon or the surface of the opposite substrate W2 having the common electrode 9 or the foregoing alignment film 10 thereon. Then a sealant is applied around the spacers to form a bank (not shown in the drawings). Subsequently, the TFT substrate W1 and the opposite substrate W2 are positioned such that their alignment films 10 face each other and that the orientations of their alignment films shift by 90° from each other.

In this state, a space between the TFT substrate W1 and the opposite substrate W2 is filled with liquid crystal to form a liquid crystal layer 11 containing liquid crystal molecules 6 (as shown in FIGS. 3A and 3B) from a port in the sealant. The liquid crystal layer 11 and the spacers used must meet a predetermined value of the product ($\Delta n \times d$) between $\Delta n$ and d at the operating temperature, where d is the thickness of the liquid crystal layer 11 held by the spacers between the TFT substrate W1 and the opposite substrate W2 and $\Delta n$ is the birefringence of the liquid crystal layer 11. If the liquid crystal panel 15 is a TN-mode panel, for example, the liquid crystal layer 11 and the spacers are selected so as to satisfy the relationship $\Delta n \times d = 0.35$ to 0.50 to exhibit a maximum transmittance where the liquid crystal molecules 6 (as shown in FIGS. 3A and 3B) are continuously twisted by 90° between the alignment films 10 of the substrates W1 and W2. Specifically, the liquid crystal layer 11 used preferably has a thickness d of 2 $\mu$m to 4 $\mu$m, a birefringence $\Delta n$ of 0.1366, and a dielectric constant $\Delta \epsilon$ of 10.4. The sealant may contain a fiber (3.2 $\mu$m in diameter) to control the thickness d.

Finally, the port in the sealant is caulked to complete the TN-mode liquid crystal panel 15. The liquid crystal panel 15 produced as described above has the stacked alignment films 10 characterized as follows. Referring back to FIGS. 3A and 3B, each of the films 10 (as shown in FIG. 5) includes the first deposited layer 4a and the second deposited layer 4b. In the first deposited layer 4a, the liquid crystal molecules 6 are aligned perpendicular to the orientation of the deposited molecules 4 as shown in FIG. 3A. In the second deposited layer 4b, the liquid crystal molecules 6 are aligned parallel to the orientation of the deposited molecules 4 as shown in FIG. 3B. Furthermore, the second deposited layer 4b is stacked on top of the first deposited layer 4a such that the deposited molecules 4 of the first layer 4a and the deposited molecules 4 of the second layer 4b are aligned by a shift angle of about 90° from each other.

The liquid crystal panel 15 (as shown in FIG. 5) produced according to the embodiment is provided with alignment films having the features described above. Alignment films having such features allow the liquid crystal molecules 6 to have a desirable pre-tilt angle when the thickness of the second deposited layer 4b is properly adjusted with respect to the thickness of the first deposited layer 4a.

This fact is detailed referring again to FIG. 1 which shows a correlation between the thickness of the second deposited layer (deposition angle of 85°) and the pre-tilt angle of liquid crystal molecules when the first deposited layer (deposition angle of 60°) has a thickness of about 40 nm. Based on this correlation, the alignment films having the features described above allow the pre-tilt angles of liquid crystal molecules to be proportional to the thickness of the second deposited layer 4b; the second deposited layer preferably has a thickness of about 0.1 nm to 0.5 nm to achieve a pre-tilt angle of about 5° to 12°, which is ideal for TN-mode liquid crystal panels, for example. Pre-tilt angles within this range synchronize the liquid crystal molecules to rise in clockwise or counterclockwise precession at the time of voltage application.

Thus, the liquid crystal panel produced according to the embodiment of the present invention has alignment films of inorganic material resistant to light and provides a pre-tilt angle suitable for a TN-mode liquid crystal panel, for example, when the thickness of the second deposited layer is properly set with respect to the thickness of the first deposited layer.

As a result, the TN-mode liquid crystal panel according to the embodiment is superior in long-term reliability, prevents display defects at the time of voltage application, and provides a quick response.

Figure 6:
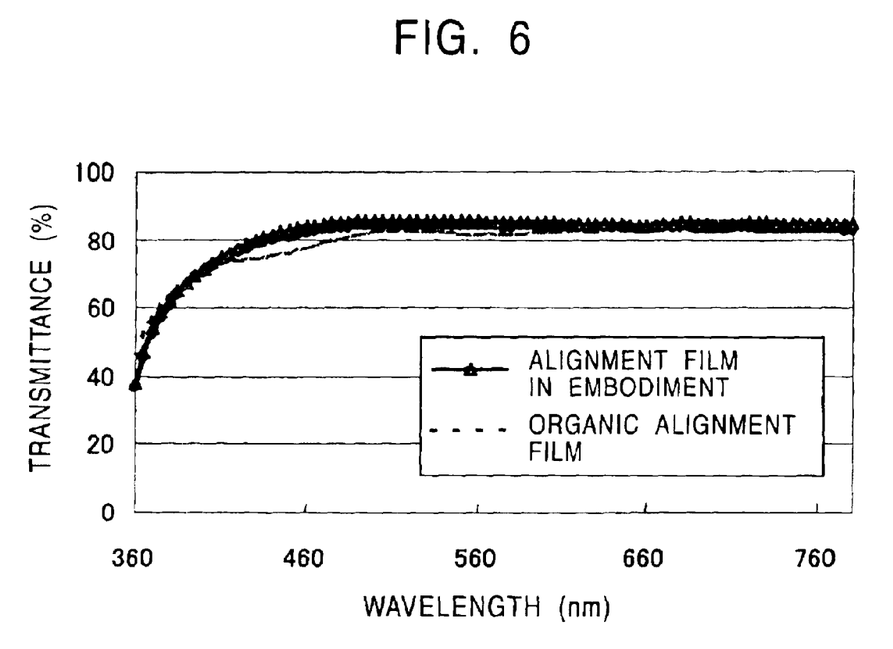
FIG. 6 shows spectral transmission of alignment films according to an embodiment.

FIG. 6 is a graph showing a comparison between the spectral transmittance of alignment films formed according to the embodiment (indicated by solid lines with triangles in FIG. 6) and the spectral transmittance of a conventional alignment film of an organic material (indicated by dashed lines in FIG. 6). As shown in FIG. 6, the alignment films according to the embodiment exhibit as good spectral transmittance as the alignment film of organic material. Rather, the former provide higher spectral transmittance than the latter for light with wavelengths of about 460 nm and about 560 nm, indicating to suppress optical loss satisfactorily when used in a liquid crystal panel. For this experiment, the alignment films according to the embodiment had a spectral transmittance substantially identical to that of the first deposited layer as a single layer.

Figure 7:
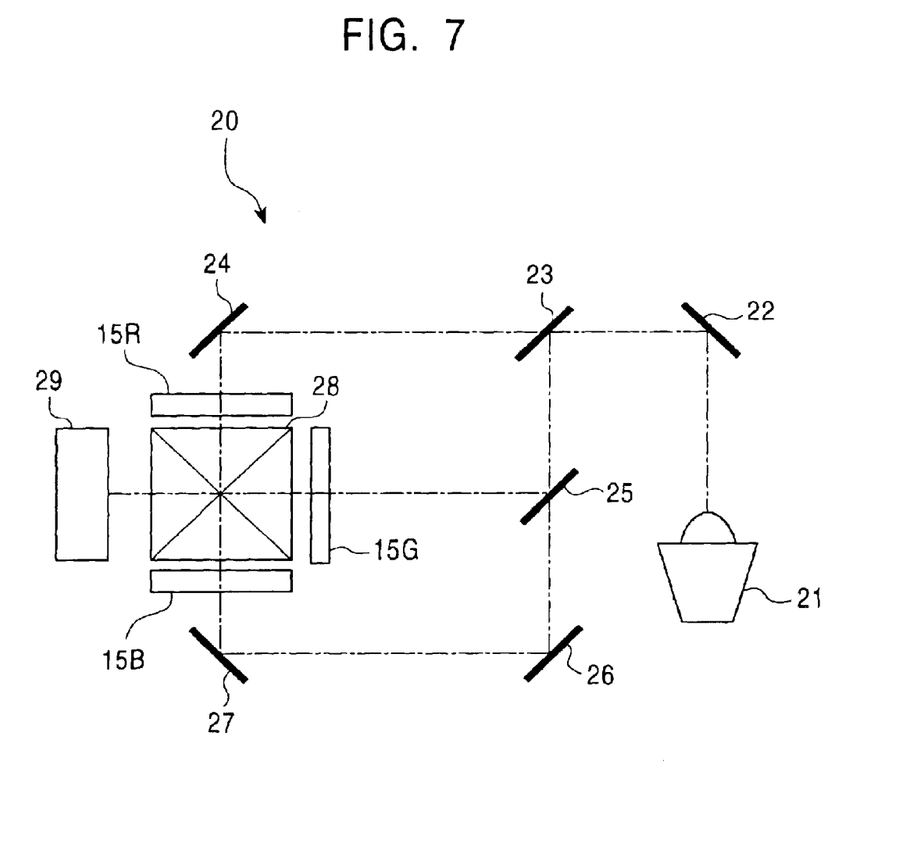
FIG. 7 is a diagram of a liquid crystal projector including liquid crystal panels according to an embodiment.

Referring now to FIG. 7, a liquid crystal projector 20 includes liquid crystal panels, that is, liquid crystal light valves 15R, 15G, and 15B. These light valves 15R, 15G, and 15B have alignment films free of deterioration by light and are suitably used as liquid crystal light valves in the liquid crystal projector 20.

The liquid crystal projector 20 includes a light source 21. The projector 20 further includes a first total reflection mirror 22, a first dichroic mirror 23, and a second total reflection mirror 24 through which light from the light source 21 passes in that order. The projector 20 further includes a second dichroic mirror 25, a third total reflection mirror 26, and a fourth total reflection mirror 27 through which the light reflected by the first dichroic mirror 23 passes in that order.

The red liquid crystal light valve 15R receives the light reflected by the second total reflection mirror 24, the green liquid crystal light valve 15G receives the light reflected by the second dichroic mirror 25, and the blue liquid crystal light valve 15B receives the light reflected by the fourth total reflection mirror 27. These liquid crystal light valves 15R, 15G, and 15B are clamped by two deflection plates perpendicular to each other.

The projector 20 further includes a dichroic prism 28 and a projector lens 29, the dichroic prism 28 being surrounded by the liquid crystal light valves 15R, 15G, and 15B and the projector lens 29 being disposed so as to receive the light emanating from the dichroic prism 28.

In the liquid crystal projector 20 described above, light emerging from the light source 21 is reflected by the mirrors 22 through 27 and enters the liquid crystal light valves 15R, 15G, and 15B. The respective light beams R, G, and B that have passed through the light valves 15R, 15G, and 15B enter the dichroic prism 28 to produce one optical image, which is then enlarged by the projector lens 29 and projected over a screen (not shown in FIG. 7).

As described above, the liquid crystal light valves 15R, 15G, and 15B are irradiated with intense light (incident light) from the light source 21. The liquid crystal projector 20 including TN-mode liquid crystal panels according to the embodiment, that is the light valves 15R, 15G, and 15B in FIG. 7 is superior in long-term reliability.

What is claimed is:

1. A liquid crystal panel including a liquid crystal layer of liquid crystal molecules sealed between a pair of substrates having alignment films each of the alignment films comprising:

a first deposited layer formed of deposited molecules of an inorganic material by oblique deposition, the liquid crystal molecules being aligned perpendicular to the orientation of the deposited molecules of the first deposited layer, and a second deposited layer formed of deposited molecules of an inorganic material by oblique deposition, the liquid crystal molecules being aligned parallel to the orientation of the deposited molecules of the second deposited layer, wherein the second deposited layer is approximately 0.25–1.25% the thickness of the first layer, and is stacked on top of the first deposited layer such that the deposited molecules of the first deposited layer are aligned substantially perpendicular to the orientation of the deposited molecules of the second deposited layer;

and wherein said alignment layers provide a pre-tilt angle of the liquid crystal molecules relative to the substrate of approximately 5°–12°.

2. The liquid crystal panel according to claim 1, wherein the first deposited layer is formed by oblique deposition which supplies deposited molecules at an angle of about 60° relative to the normal of the corresponding substrate and the second deposited layer is formed by oblique deposition which supplies deposited molecules at an angle of about 85° relative to the normal of the corresponding substrate.

3. The liquid crystal panel of claim 1, wherein the first layer has a thickness of approximately 40 nm and the second layer has a thickness of approximately 0.1–0.5 nm.

4. A method for manufacturing a liquid crystal panel including a liquid crystal layer of liquid crystal molecules sealed between a pair of substrates having alignment films formed on surfaces thereof, the method comprising:

a first step of forming a first deposited layer of deposited molecules on the substrates by oblique deposition, the liquid crystal molecules being aligned perpendicular to the orientation of the deposited molecules, and a second step of forming a second deposited layer of deposited molecules over the first deposited layer by oblique deposition where the deposited molecules are supplied onto the substrates in a direction shifted by about 90° from the oblique deposition direction in the first step, the liquid crystal molecules being aligned parallel to the orientation of the deposited molecules, wherein the second deposited layer is approximately 0.25–1.25% the thickness of the first layer, and is stacked on the first deposited layer to form an alignment film;

and wherein said alignment layers provide a pre-tilt angle of the liquid crystal molecules relative to the substrate of approximately 5°–12°.

5. The method according to claim 4, wherein the first step comprises oblique deposition supplying the deposited molecules at an angle of about 60° relative to the normal of the substrates and the second step comprises oblique deposition supplying the deposited molecules at an angle of about 8520 relative to the normal of the substrates.

6. The method for manufacturing a liquid crystal panel of claim 4, wherein the first layer has a thickness of approximately 40 nm and the second layer has a thickness of approximately 0.1–0.5 nm.

* * * * *